(12) United States Patent
An et al.

(10) Patent No.: US 10,508,860 B2
(45) Date of Patent: Dec. 17, 2019

(54) VACUUM DRYING SYSTEM AND VACUUM DRYING METHOD

(71) Applicants: Boe Technology Group Co., Ltd., Beijing (CN); Hefei Boe Optoelectronics Technology Co., Ltd., Anhui (CN)

(72) Inventors: Yusheng An, Beijing (CN); Qingyong Meng, Beijing (CN)

(73) Assignees: BOE TECHNOLOGY GROUP CO., LTD., Beijing (CN); HEFEI BOE OPTOELECTRONICS TECHNOLOGY CO., LTD., Anhui (CN)

( * ) Notice: Subject to any disclaimer, the term of this patent is extended or adjusted under 35 U.S.C. 154(b) by 256 days.

(21) Appl. No.: 15/326,754

(22) PCT Filed: Aug. 3, 2016

(86) PCT No.: PCT/CN2016/092993
§ 371 (c)(1),
(2) Date: Jun. 9, 2017

(87) PCT Pub. No.: WO2017/076081
PCT Pub. Date: May 11, 2017

(65) Prior Publication Data
US 2017/0268822 A1    Sep. 21, 2017

(30) Foreign Application Priority Data

Nov. 4, 2015  (CN) .......................... 2015 1 0744626

(51) Int. Cl.
*F26B 25/00* (2006.01)
*B65G 47/90* (2006.01)

(52) U.S. Cl.
CPC ............ *F26B 25/004* (2013.01); *B65G 47/90* (2013.01)

(58) Field of Classification Search
CPC ......... F26B 25/004; F26B 5/045; B65G 47/90
See application file for complete search history.

(56) References Cited

U.S. PATENT DOCUMENTS 6,936,107 B2 * 8/2005 Kitano .................... G03F 7/162
118/52
7,976,261 B2 * 7/2011 Snodgrass ............ B65G 49/061
198/604
(Continued)

FOREIGN PATENT DOCUMENTS

CN       2919303      7/2007
CN       202292780    7/2012
(Continued)

OTHER PUBLICATIONS

International Search Report for PCT/CN2016/092993 dated Oct. 24, 2016.
(Continued)

*Primary Examiner* — Michael S Lowe
(74) *Attorney, Agent, or Firm* — Calfee, Halter & Griswold LLP (57) ABSTRACT

A vacuum drying system includes: a support platform, which is used to support the substrate, wherein the support platform comprises a plurality of sub-platforms which are arranged along a predetermined direction and there are gaps between the adjacent sub-platforms; a mechanical arm which comprises a plurality of strip structures at positions corresponding to the gaps, and is used to place the substrate onto the support platform or move the substrate out of the support platform. Comparing to the prior art wherein the substrate is supported by a plurality of needle-shaped supports in the vacuum drying process, in the technical solution
(Continued)

of the present disclosure, the contact area between the support platform and the substrate is much larger, which can reduce the local pressure on the substrate, thereby avoiding the display brightness mura of the substrate caused by the supporting operation in the vacuum drying process.

7 Claims, 5 Drawing Sheets

(56) References Cited

U.S. PATENT DOCUMENTS

| | | | |
|---|---|---|---|
| 9,087,865 B2* | 7/2015 | Liu | H01L 21/67736 |
| 2005/0135905 A1* | 6/2005 | Moriya | B65G 49/067 |
| | | | 414/222.01 |
| 2005/0211531 A1* | 9/2005 | Kim | B65G 49/061 |
| | | | 198/618 |
| 2008/0025823 A1* | 1/2008 | Harumoto | H01L 21/67201 |
| | | | 414/217.1 |
| 2011/0286818 A1* | 11/2011 | Kim | H01L 21/6734 |
| | | | 414/222.01 |
| 2016/0372343 A1 | 12/2016 | Wang et al. | |

FOREIGN PATENT DOCUMENTS

| | | |
|---|---|---|
| CN | 104617017 | 5/2015 |
| CN | 105195397 | 12/2015 |

OTHER PUBLICATIONS

Office Action from Chinese Patent Application No. 201510744626.8 dated Mar. 28, 2017.
Second Office Action for Chinese Patent Application No. 201510744626.8 dated Sep. 27, 2017.
Baidu, Baike; Baidu Encyclopedia, Title: "Robot"; https://baike.baidu.com/history/85479034, p. 1, Sep. 16, 2015).
Third Office Action for Chinese Patent Application No. 201510744626.8 dated Jan. 19, 2018.

* cited by examiner

VACUUM DRYING SYSTEM AND VACUUM DRYING METHOD

RELATED APPLICATIONS

The present application is the U.S. national phase entry of PCT/CN2016/092993, with an international filing date of Aug. 3, 2016, claims the benefit of Chinese Patent Application No. 201510744626.8, filed on Nov. 4, 2015, the entire disclosure of which is incorporated herein by reference.

FIELD OF THE DISCLOSURE

The present disclosure relates to the technical field of display, in particular, relates to a vacuum drying system and a vacuum drying method.

DESCRIPTION OF THE PRIOR ART

In the production process of a color filter substrate, there are procedures of applying photoresist and drying the photoresist in vacuum.

In prior art, the vacuum drying apparatus generally employs a plurality of needle-shaped supports to support the substrate. Because the contact area between the support and the substrate is small, large pressure is easily applied to the substrate so that the substrate might has display brightness unevenness (mura), thereby lowering the yield. In order to provide a suitable support position, a wide dummy region is required on the substrate so that the effective utilization area of the substrate is lowered. As to substrates with different dimensions, the support positions of the supports are different. The supports should be changed and placed manually, thereby increasing the process time. Besides, the placement accuracy of the supports cannot be ensured by a manual operation, which will lower the yield. In addition, there is a risk that a tip structure of the support might poke the operators.

SUMMARY OF THE DISCLOSURE

A technical problem to be solved by the present disclosure is to improve the support process of a substrate in a vacuum drying system.

For this purpose, the present disclosure provides a vacuum drying system, comprising:

a support platform, which is used to support the substrate, wherein the support platform comprises a plurality of sub-platforms which are arranged along a predetermined direction and there are gaps between the adjacent sub-platforms; and a mechanical arm which comprises a plurality of strip structures at positions corresponding to the gaps, and is used to place the substrate onto the support platform or move the substrate out of the support platform.

According to an aspect of the present disclosure, the system further comprises:

a plurality of support bars, wherein the width of the support bar is equal to the width of the gap, the length of the support bar is equal to the length of the gap, and the plurality of support bars will be inserted into the gaps after the substrate has been placed onto the support platform and the mechanical arm has been moved out of the gaps, so as to support the substrate together with the support platform.

According to another aspect of the present disclosure, the system further comprises:

a control unit, which is used to control the mechanical arm and/or the support bars.

According to a further aspect of the present disclosure, when receiving an instruction to place the substrate onto the support platform, the control unit will control the mechanical arm to move the substrate to a horizontal plane at a predetermined distance from the upper surface of the support platform, control the mechanical arm to insert into the gaps, control the mechanical arm to descend a predetermined distance in order to put the substrate onto the support platform, and then control the mechanical arm to move out of the gaps.

According to yet another aspect of the present disclosure, when receiving an instruction to move the substrate out of the support platform, the control unit will control the mechanical arm to insert into the gaps, control the mechanical arm to raise a predetermined distance so that the substrate can be lifted at the predetermined distance from the upper surface of the support platform, control the mechanical arm to move out of the gaps so that the substrate can be moved out of the support platform.

According to another aspect of the present disclosure, after placing the substrate onto the support platform and moving the mechanical arm out of the gap, the control unit can control the plurality of support bars to insert into the gaps in response to a received instruction; when the control unit receives the instruction to move the substrate out of the support platform, it controls the plurality of support bars to move out of the gaps.

According to a further aspect of the present disclosure, the system further comprises: a vacuum drying chamber, which is used to dry the substrate in vacuum.

The present disclosure also provides a vacuum drying method using the above system, the method comprising:

controlling the mechanical arm to place the substrate onto the support platform or move the substrate out of the support platform in response to the received instruction.

According to an aspect, the method comprises: when receiving the instruction to place the substrate onto the support platform, controlling the mechanical arm to move the substrate to a horizontal plane at a predetermined distance from the upper surface of the support platform, controlling the mechanical arm to insert into the gaps, controlling the mechanical arm to descend a predetermined distance in order to put the substrate onto the support platform, and then controlling the mechanical arm to move out of the gaps.

According to another aspect, the method comprises: when receiving the instruction to move the substrate out of the support platform, controlling the mechanical arm to insert into the gaps, controlling the mechanical arm to raise a predetermined distance so that the substrate can be lifted at the predetermined distance from the upper surface of the support platform, controlling the mechanical arm to move out of the gaps so that the substrate can be moved out of the support platform.

According to the technical solution of the present disclosure, the substrate is supported by the support platform. Comparing to the prior art wherein the substrate is supported by a plurality of needle-shaped supports in the vacuum drying process, in the technical solution of the present disclosure, the contact area between the support platform and the substrate is much larger, which can reduce the local pressure on the substrate, thereby avoiding the display brightness mura of the substrate caused by the supporting operation in the vacuum drying process. Besides, it does not require a wide dummy region and the area of the substrate can be effectively used.

BRIEF DESCRIPTION OF DRAWINGS

The features and advantages of the present disclosure will be more clearly illustrated and understood by referring the drawings. The drawings are schematic and should not be construed to limit the present disclosure. In the drawings.

DETAILED DESCRIPTION OF THE PRESENT DISCLOSURE

In order to clearly illustrate and explain the objects, features and advantages of the present disclosure, the present disclosure will be described in more detail in conjunction with the drawings and embodiments. It should be noted that the embodiments in the application or the features in different embodiments can be combined with each other without conflicting.

Various details are elaborated in the following description so that the present disclosure can be understood thoroughly. However, the present disclosure can be implemented in other ways different from the ways described herein. Therefore, the protection scope of the present disclosure is not restricted by the following embodiments.

Figure 1:
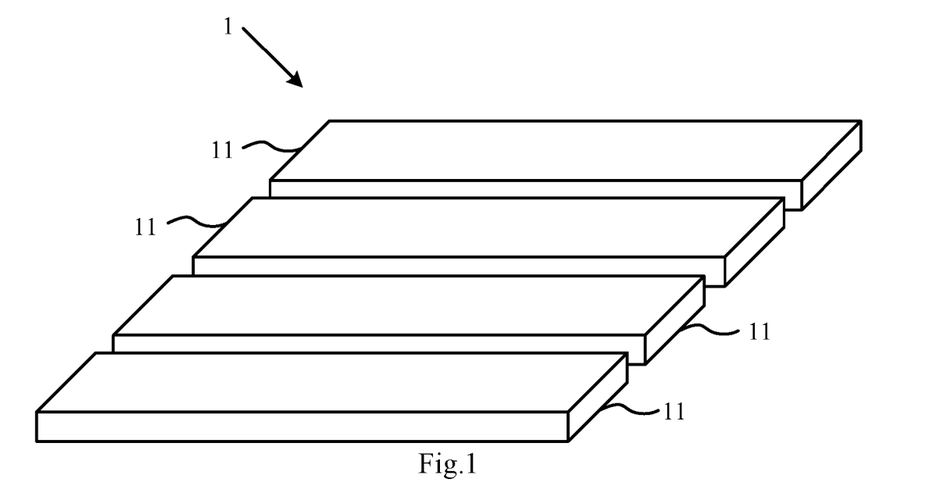
FIG. 1 is a schematic perspective view showing a support platform according to an embodiment of the present disclosure.
Figure 2:
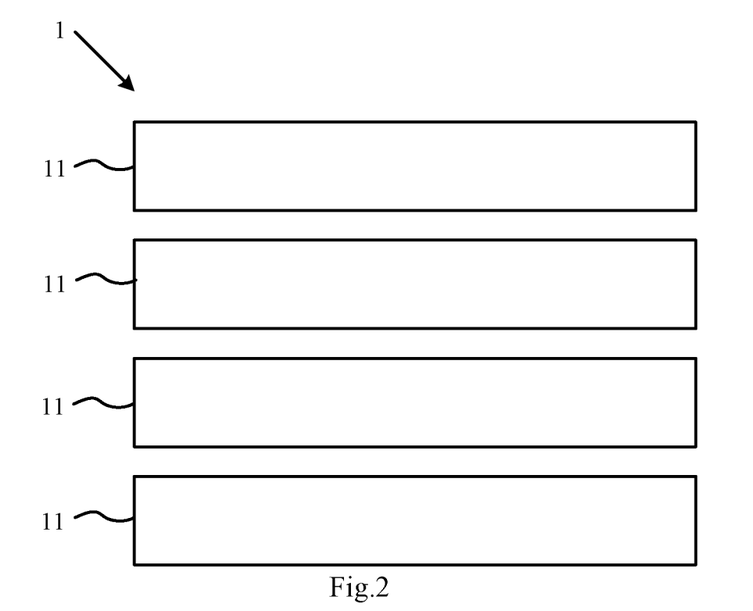
FIG. 2 is a plan view showing a support platform according to an embodiment of the present disclosure.
Figure 3:
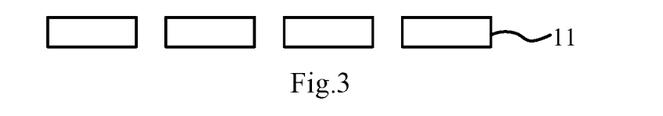
FIG. 3 is a left side view showing a support platform according to an embodiment of the present disclosure.
Figure 4:
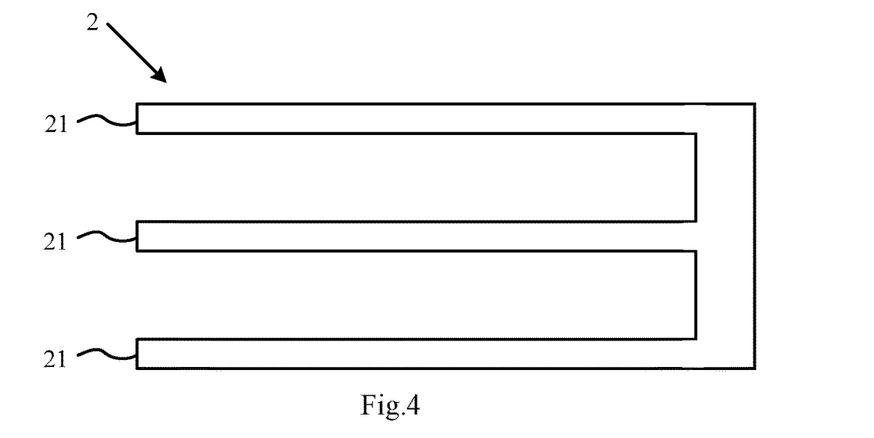
FIG. 4 is a schematic plan view showing a mechanical arm according to an embodiment of the present disclosure.
Figure 5:
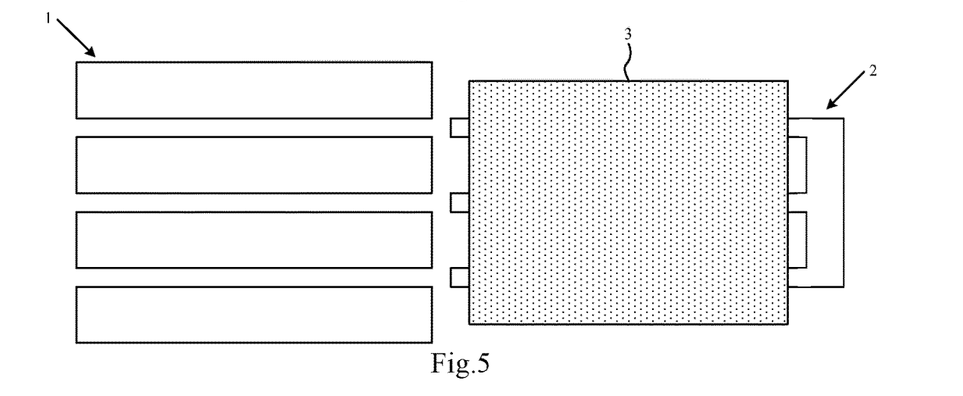
FIG. 5 and FIG. 6 are schematic views showing the step of placing the substrate onto the support platforms according to an embodiment of the present disclosure.
Figure 6:
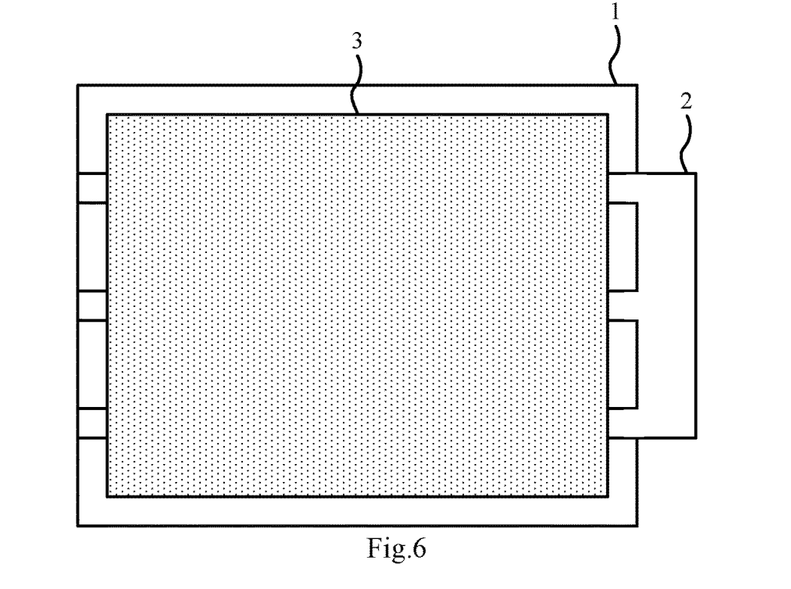

As shown in FIG. 1, FIG. 2 and FIG. 3, a vacuum drying system according to an embodiment of the present disclosure comprises;

a support platform 1, which is used to support the substrate, wherein the support platform 1 comprises a plurality of sub-platforms 11 which are arranged along a predetermined direction and there are gaps between the adjacent sub-platforms 11;

a mechanical arm 2 which comprises a plurality of strip structures 21 at positions corresponding to the gaps, as shown in FIG. 4, FIG. 5 and FIG. 6, the mechanical arm 2 is used to place the substrate 3 onto the support platform 1 or move the substrate 3 out of the support platform 1.

In present embodiment, the substrate is supported by the support platform. Comparing to the prior art wherein the substrate is supported by a plurality of needle-shaped supports in the vacuum drying process, in the technical solution of the present disclosure, the contact area between the support platform and the substrate is much larger, which can reduce the local pressure on the substrate, thereby avoiding the display brightness mura of the substrate caused by the supporting operation in the vacuum drying process. Besides, it does not require a wide dummy region and the area of the substrate can be effectively used.

Besides, in present embodiment, the mechanical arm is used instead of needle-shaped supports, so there is no need to place the needle-shaped supports manually, thereby avoiding poking the operators by a tip of the support. In addition, the movement of the substrate is performed automatically, which can shorten the process time.

In this embodiment, the support platform can be provided with large area in order to adapt to the substrate for various color filter substrates. The width of the strip structure of the mechanical arm can be set equal to or smaller than the width of the gap. In this embodiment, the situation that the support platform has 4 sub-platforms and 3 gaps and the support arm comprises 3 strip structures is only exemplary. The support platform can comprise any number of sub-platforms as needed and the support arm can comprise any number of strip structures as needed, wherein the number of the strip structures is smaller than or equal to the number of the gaps.

Figure 7:
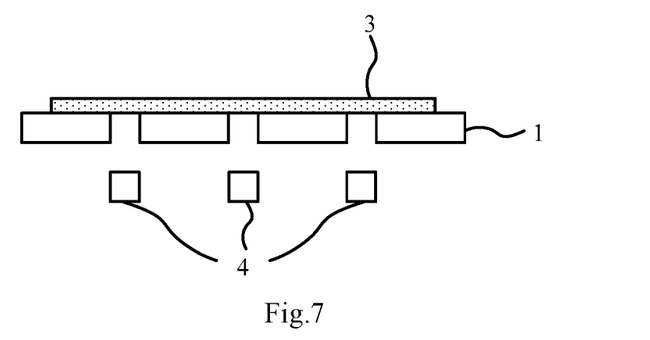
FIG. 7 to FIG. 9 are schematic views showing step of inserting the support bars into gaps according to an embodiment of the present disclosure.
Figure 8:
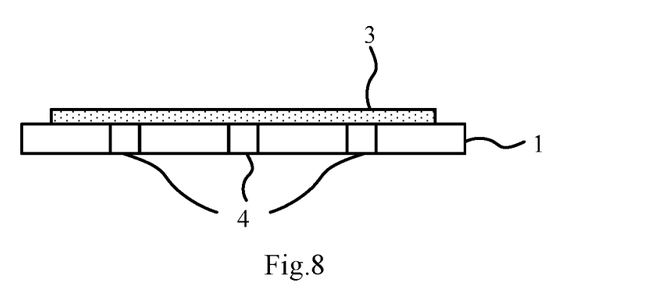
Figure 9:
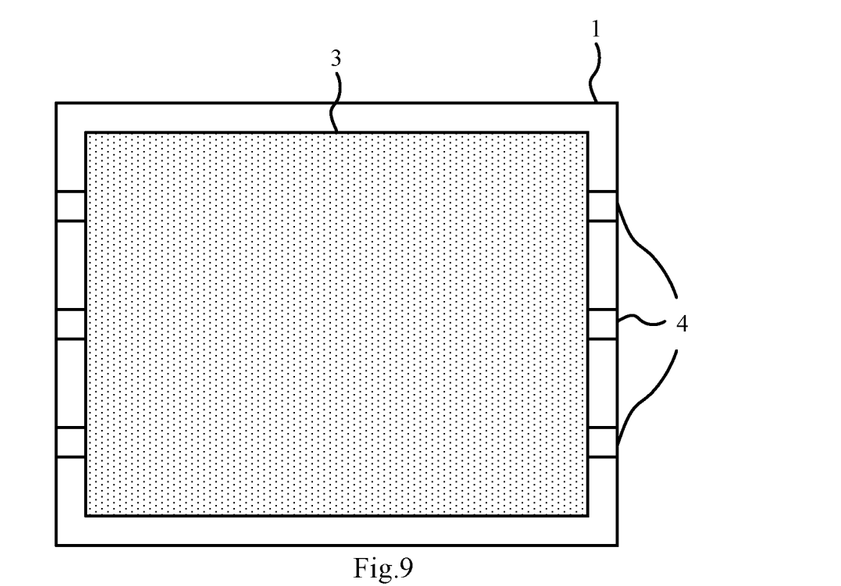

As shown in FIG. 7, according to an aspect of the present disclosure, the system further comprises:

a plurality of support bars 4, wherein the width of the support bar 4 is equal to the width of the gap and the length of the support bar 4 is equal to the length of the gap. After placing the substrate 3 onto the support platform 1 and moving the mechanical arm 2 out of the gaps, the support bars 4 are inserted into the gaps so as to support the substrate 3 together with the support platform 1, as shown in FIG. 8 and FIG. 9.

The gaps between the sub-platforms can be fitted with the strip structures of the mechanical arms so that the mechanical arms can place the substrate onto the support platform or move the substrate out of the support platform. When the substrate is located on the support platform, due to the existence of the gaps, there might be uneven stress on the substrate.

In present embodiment, when the substrate is located on the support platform, the support bars can be inserted into the support platform, and support the substrate together with the support platform, so that the whole lower surface of the substrate will contact the support face, thereby the force on the substrate will be even during the supporting process.

According to an aspect of the present disclosure, the system further comprises:

a control unit (not shown), which is used to control the mechanical arm 2 and/or the support bars 4. It is convenient for the users to control as needed.

According to another aspect of the present disclosure, when receiving the instruction to place the substrate 3 onto the support platform 1, the control unit will control the mechanical arm 2 to move the substrate 3 to a horizontal plane at a predetermined distance from the upper surface of the support platform 1, control the mechanical arm 2 to insert into the gaps, control the mechanical arm 2 to descend a predetermined distance in order to put the substrate 3 onto the support platform 1, and then control the mechanical arm 2 to move out of the gap.

During the process of placing the substrate onto the support platform, the predetermined distance between the substrate and the upper surface of the support platform will ensure that the substrate will not contact the support platform during the process of inserting the mechanical arm into the gaps, and thus the position of the substrate on the mechanical arm will not be changed so that when the mechanical arm is controlled to move the substrate onto the support platform, the substrate can be located at the designated position on the support platform according to the predetermined setting to facilitate the subsequent moving out operation. After placing the substrate onto the support platform, the mechanical arm will be retracted from the gaps, which can ensure the successive support bars can be inserted into the gaps.

According to an aspect of the present disclosure, when receiving the instruction to move the substrate 3 out of the support platform 1, the control unit will control the mechanical arm 2 to insert into the gaps, control the mechanical arm 2 to raise a predetermined distance so that the substrate 3 can be lifted at the predetermined distance from the upper surface of the support platform 1, control the mechanical arm 2 to move out of the gap so that the substrate 3 can be moved out of the support platform 1.

During the process of moving the substrate out of the support platform, first, the mechanical arm 2 will be moved upwards so that the substrate will be at a predetermined distance from the upper surface of the support platform. It can be ensured that the substrate will not contact the support platform during the process of moving the mechanical arm out of the gaps. Therefore, it can be ensured that during the process of moving the mechanical arm out of the gaps, the substrate will not contact the support platform and be at a designated position on the mechanical arm to facilitate subsequent operations.

According to an aspect of the present disclosure, after placing the substrate 3 onto the support platform 1 and moving the mechanical arm 2 out of the gaps, the control unit can control the plurality of support bars 4 to insert into the gaps in response to a received instruction; when the control unit receives the instruction to move the substrate 3 out of the support platform 1, it will control the plurality of support bars 4 to move out of the gaps.

When receiving the instruction to move the substrate out of the support platform, by first controlling the plurality of support bars to move out of the gaps, it can be ensured that the mechanical arm can insert into the gaps smoothly during the successive moving out operation.

According to an aspect of the present disclosure, the above system further comprises:

a vacuum drying chamber (not shown), which is used to dry the substrate 3 in vacuum.

The present disclosure also provides a vacuum drying method using the above system, further comprising;

controlling the mechanical arm to place the substrate onto the support platform or move the substrate out of the support platform in response to a received instruction.

Figure 10:
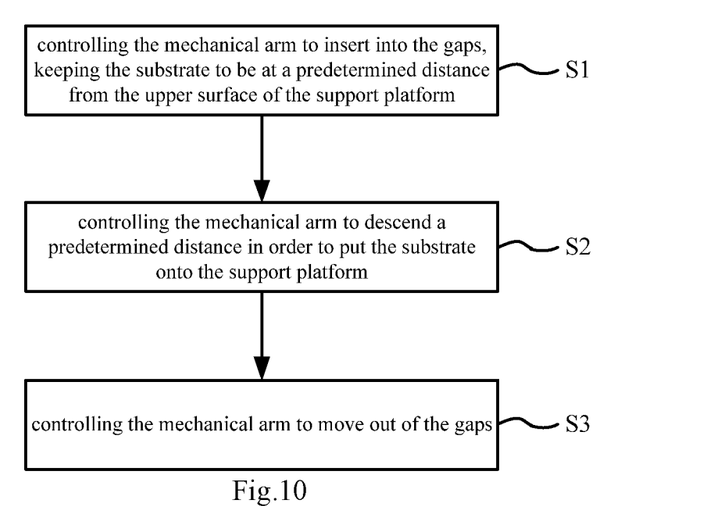
FIG. 10 is a flow chart showing the step of placing the substrate onto the support platform according to an embodiment of the present disclosure.

As shown in FIG. 10, according to an aspect of the present disclosure, the method comprises:

when receiving the instruction to place the substrate onto the support platform, S1, controlling the mechanical arm to insert into the gaps, keeping the substrate to be at a predetermined distance from the upper surface of the support platform; S2, controlling the mechanical arm to descend a predetermined distance in order to put the substrate onto the support platform; and S3 controlling the mechanical arm to move out of the gaps.

Figure 11:
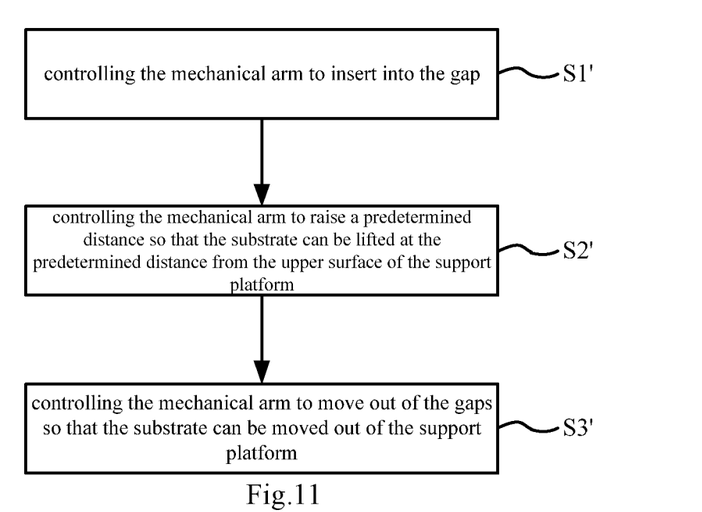
FIG. 11 is a flow chart showing the step of moving the substrate out of the support platform according to an embodiment of the present disclosure.
Figure 12:
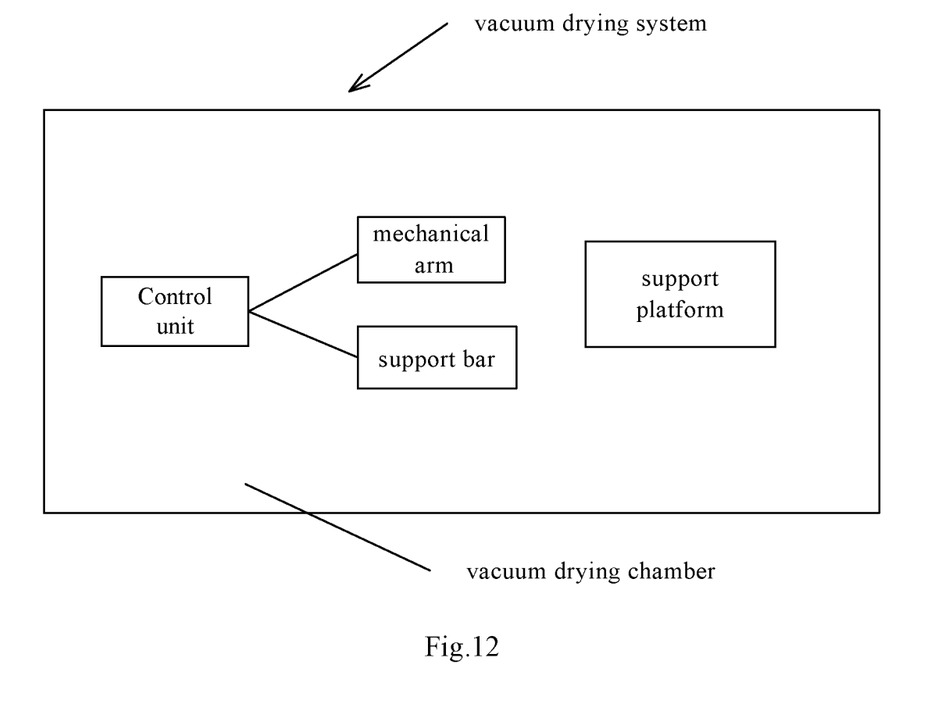
FIG. 12 is a schematic block diagram showing a vacuum drying system according to an embodiment of the present disclosure.

As shown in FIG. 11, according to an aspect of the present disclosure, the method comprises: when receiving the instruction to move the substrate out of the support platform, S1', controlling the mechanical arm to insert into the gap; S2', controlling the mechanical arm to raise a predetermined distance so that the substrate can be lifted at the predetermined distance from the upper surface of the support platform; S3', controlling the mechanical arm to move out of the gaps so that the substrate can be moved out of the support platform.

The technical solution of the present disclosure has been illustrated with the reference to the drawings. In the prior art, the vacuum drying apparatus generally employs a plurality of needle-shaped supports to support the substrate. Because the contact area between the supports and the substrate is small, large pressure is easily generated on the substrate so that the substrate might have display brightness mura, thereby lowering the yield. Comparing to the prior art wherein the substrate is supported by a plurality of needle-shaped supports in the vacuum drying process, in the technical solution of the present disclosure, the contact area between the support platform and the substrate is much larger, which can reduce the local pressure on the substrate, thereby avoiding the display brightness mura of the substrate caused by the supporting operation in the vacuum drying process. Besides, it does not require s wide dummy region and the area of the substrate can be effectively used.

In the present disclosure, the term "a plurality of" means two or more than two, unless otherwise defined. Moving the mechanical arm out of the gaps comprises the situations that the mechanical arm moves out of the gaps along the longitudinal direction of the gaps and the mechanical arm moves out of the gaps perpendicular to the longitudinal direction of the gaps. Similarly, inserting the mechanical arm into the gaps comprises the situations that the mechanical arm inserts into the gaps along the longitudinal direction of the gaps and the mechanical arm inserts into the gaps perpendicular to the longitudinal direction of the gaps.

The above description is only exemplary embodiments of the present disclosure. However, the scope of the present disclosure is not restricted to those embodiments. Within the technical scope disclosed herein, various variations, substitutions or improvement will occur to those skilled in the art within the scope of the present disclosure. Therefore, the protection scope of the present disclosure should be the protection scope of the claims.

What is claimed is:

1. A vacuum drying system, comprising:
   a vacuum drying chamber configured to dry a substrate in vacuum;
   a support platform, which is used to support the substrate, wherein the support platform comprises a plurality of sub-platforms arranged along a predetermined direction and wherein the support platform comprises has gaps between adjacent sub-platforms;
   a mechanical arm which comprises a plurality of strip structures at positions corresponding to the gaps, wherein the mechanical arm is used to place the substrate onto the support platform or move the substrate out of the support platform;
   a plurality of support bars, wherein a width of the support bar is equal to a width of the gap, a length of the support bar is equal to a length of the gap, and the plurality of support bars are configured in such a manner that surfaces of the plurality of support bars facing the substrate are flush with a support surface of the support platform when the plurality of support bars are inserted into the gaps, thereby a force on the substrate is even during a supporting process; and
   a control unit, which is configured to control the mechanical arm and the plurality of support bars to move out of the gaps of the support platform or move into the gaps of the support platform;

wherein the support platform, the mechanical arm, the plurality of support bars and the control unit are arranged within the vacuum drying chamber.

2. The system according to claim 1, wherein:
when receiving an instruction to place the substrate onto the support platform, the control unit will control the mechanical arm to move the substrate to a horizontal plane at a predetermined distance from an upper surface of the support platform, control the mechanical arm to insert into the gaps, control the mechanical arm to descend a predetermined distance in order to put the substrate onto the support platform, and then control the mechanical arm to move out of the gaps.

3. The system according to claim 2, wherein: when receiving an instruction to move the substrate out of the support platform, the control unit will control the mechanical arm to insert into the gaps, control the mechanical arm to raise a predetermined distance so that the substrate can be lifted at the predetermined distance from the upper surface of the support platform, control the mechanical arm to move out of the gaps so that the substrate can be moved out of the support platform.

4. The system according to claim 3, wherein: after placing the substrate onto the support platform and moving the mechanical arm out of the gaps, the control unit can control the plurality of support bars to insert into the gaps in response to a received instruction; when the control unit receives a instruction to move the substrate out of the support platform, it controls the plurality of support bars to move out of the gaps.

5. A vacuum drying method comprising the following steps:
Providing a vacuum drying chamber to dry a substrate in vacuum;
providing within the vacuum drying chamber:
a support platform, which is used to support the substrate, wherein the support platform comprises a plurality of sub-platforms arranged along a predetermined direction and wherein the support platform comprises has gaps between adjacent sub-platforms;
a mechanical arm which comprises a plurality of strip structures at positions corresponding to the gaps, wherein the mechanical arm is used to place the substrate onto the support platform or move the substrate out of the support platform;
a plurality of support bars, wherein a width of the support bar is equal to a width of the gap, a length of the support bar is equal to a length of the gap, and the plurality of support bars are configured in such a manner that surfaces of the plurality of support bars facing the substrate are flush with a support surface of the support platform when the plurality of support bars are inserted into the gaps, thereby a force on the substrate is even during a supporting process; and
a control unit, which is configured to control the mechanical arm and the plurality of support bars to move out of the gaps of the support platform or move into the gaps of the support platform; and
controlling the mechanical arm to place the substrate onto the support platform or move the substrate out of the support platform in response to a received instruction.

6. The method according to claim 5, wherein controlling the mechanical arm to place the substrate onto the support platform in response to the received instruction comprising:
when receiving a instruction to place the substrate onto the support platform, controlling the mechanical arm to insert into the gaps and keep the substrate to be at a predetermined distance from an upper surface of the support platform,
controlling the mechanical arm to descend a predetermined distance in order to put the substrate onto the support platform, and
controlling the mechanical arm to move out of the gaps.

7. The method according to claim 5, wherein controlling the mechanical arm to move the substrate out of the support platform in response to the received instruction comprising:
when receiving an instruction to move the substrate out of the support platform, controlling the mechanical arm to insert into the gaps,
controlling the mechanical arm to raise a predetermined distance so that the substrate can be lifted at a predetermined distance from an upper surface of the support platform, and
controlling the mechanical arm to move out of the gaps so that the substrate can be moved out of the support platform.

* * * * *